United States Patent [19]
Chiang

[11] Patent Number: 5,813,770
[45] Date of Patent: Sep. 29, 1998

[54] HUB OF A BICYCLE

[76] Inventor: Douglas Chiang, 2F, 903, Shiang Sin South Rd., Taichung, Taiwan

[21] Appl. No.: 529,998

[22] Filed: Sep. 19, 1995

[51] Int. Cl.$^6$ .............................. F16C 19/49; B60B 27/00
[52] U.S. Cl. ........................ 384/545; 384/454; 384/458; 384/494; 384/586
[58] Field of Search .................................. 384/454, 512, 384/545, 589, 586, 494, 458; 74/594.1

[56] References Cited

U.S. PATENT DOCUMENTS

| 582,599 | 5/1897 | Brownell | 384/589 |
|---|---|---|---|
| 2,277,748 | 3/1942 | Duffy | 384/458 |
| 5,181,437 | 1/1993 | Chi | 384/545 X |
| 5,233,885 | 8/1993 | Lin et al. | 384/545 X |
| 5,383,729 | 1/1995 | Hsieh | 384/545 |

FOREIGN PATENT DOCUMENTS

| 586077 | 3/1925 | France | 384/545 |
|---|---|---|---|
| 240094 | 3/1946 | Switzerland | 384/545 |

*Primary Examiner*—Thomas R. Hannon

[57] ABSTRACT

A hub of a bicycle includes a hub shell which has two dust caps threadedly engaged to both ends of the hub shell, a sleeve inserted in the hub shell and located between the two dust caps, an axle rotatably inserted in the sleeve and has a first and a second flanges extending therefrom for a bearing disposed between the first flange and one of the two dust caps and between the second flange and the other dust cap, the axle having a third and a fourth flanges extending therefrom between the first and the second flanges, a first bearing and a second bearing respectively disposed between the first and the third flanges and between the second and the fourth flanges.

2 Claims, 3 Drawing Sheets

HUB OF A BICYCLE

BACKGROUND OF THE INVENTION

1. Field of Invention

The present invention relates to a hub of a bicycle and more particularly to a hub which has an axle rotatably received in a hub shell and a plurality of bearings disposed to the axle.

2. Related Prior Art

The closest prior art of which applicant is aware is U.S. Pat. No. 5,181,437 entitled as "hub of a bicycle", filed on Jul. 13, 1992 to Yi-Chen Chi, the hub includes a hub shell having two ends and a tube is inserted in the hub shell, an axle is rotatably received in the tube by rotatably disposing two sets of bearings between the tube and the axle and a dust cap is disposed to each end of the hub shell. The axle is supported by the two sets of bearings located on each end of the hub shell, however, when the bicycle is ridden over a rugged road, the bearings bear not only the weight of the rider but also the shocks transferred from the ground. The two bearings tend to be damaged because they are located separately and are not designed to bear the large load.

The present invention intends to provide a hub of a bicycle, which has four sets of bearings disposed to the axle thereof so as to mitigate and/or obviate the above-mentioned problems.

SUMMARY OF THE INVENTION

The present invention provides a hub of a bicycle, which includes a hub shell, two dust caps, a sleeve and an axle rotatably received in the sleeve by disposing two bearings between the axle and the sleeve, the axle having four flanges extending outwardly and radially therefrom, a first bearing disposed to the axle between the first two flanges and a second bearing disposed to the axle between the other two flanges such that a load exerted to the hub is shared by the two bearings and the first and the second bearings.

It is an object of the present invention to provide a hub of a bicycle and an axle of the hub has four flanges extending therefrom and has four bearings disposed to the axle such that the hub bears a larger load compared to the conventional hub.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
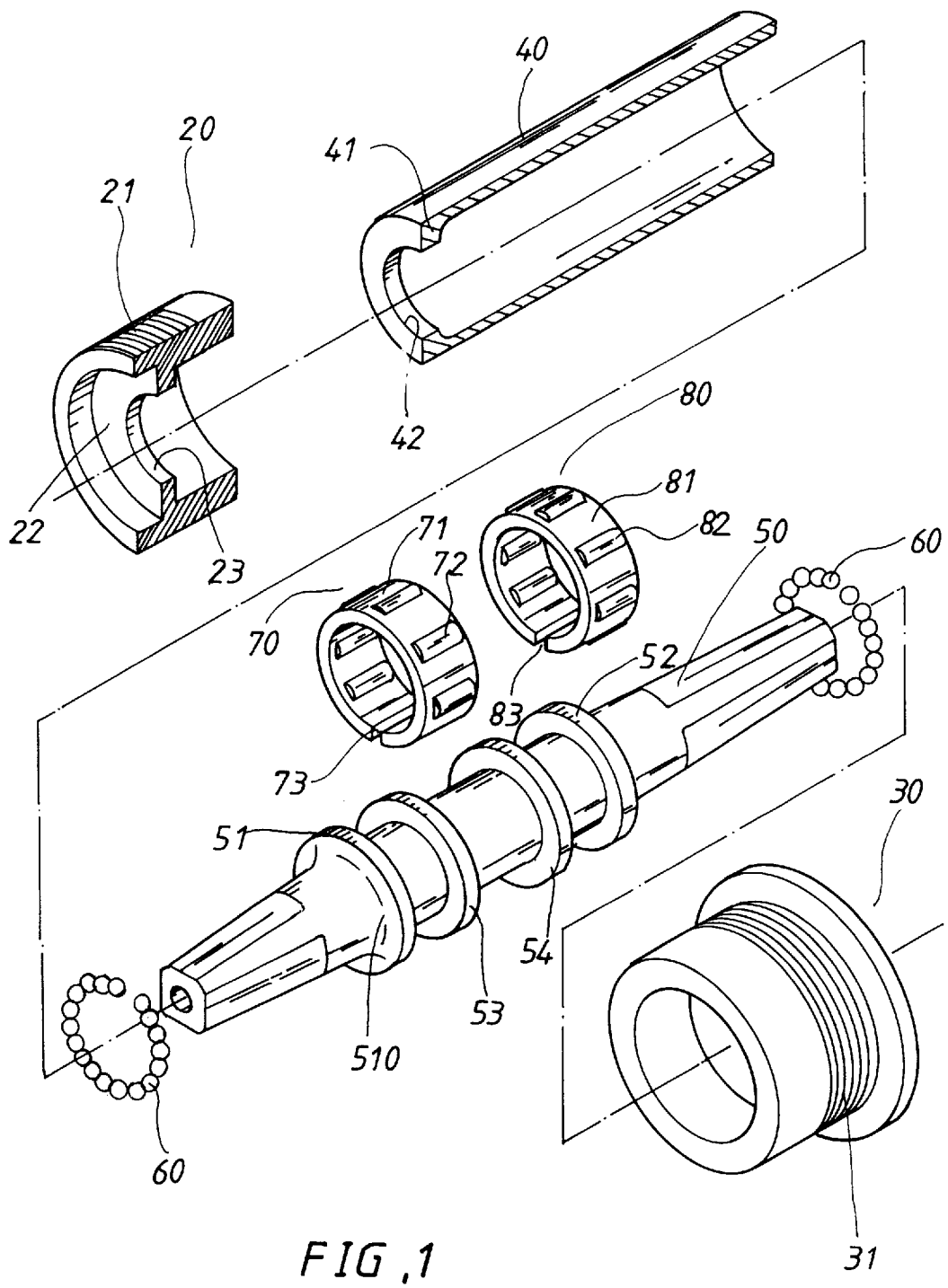
FIG. 1 is an exploded view of a hub in accordance with the present invention.
Figure 2:
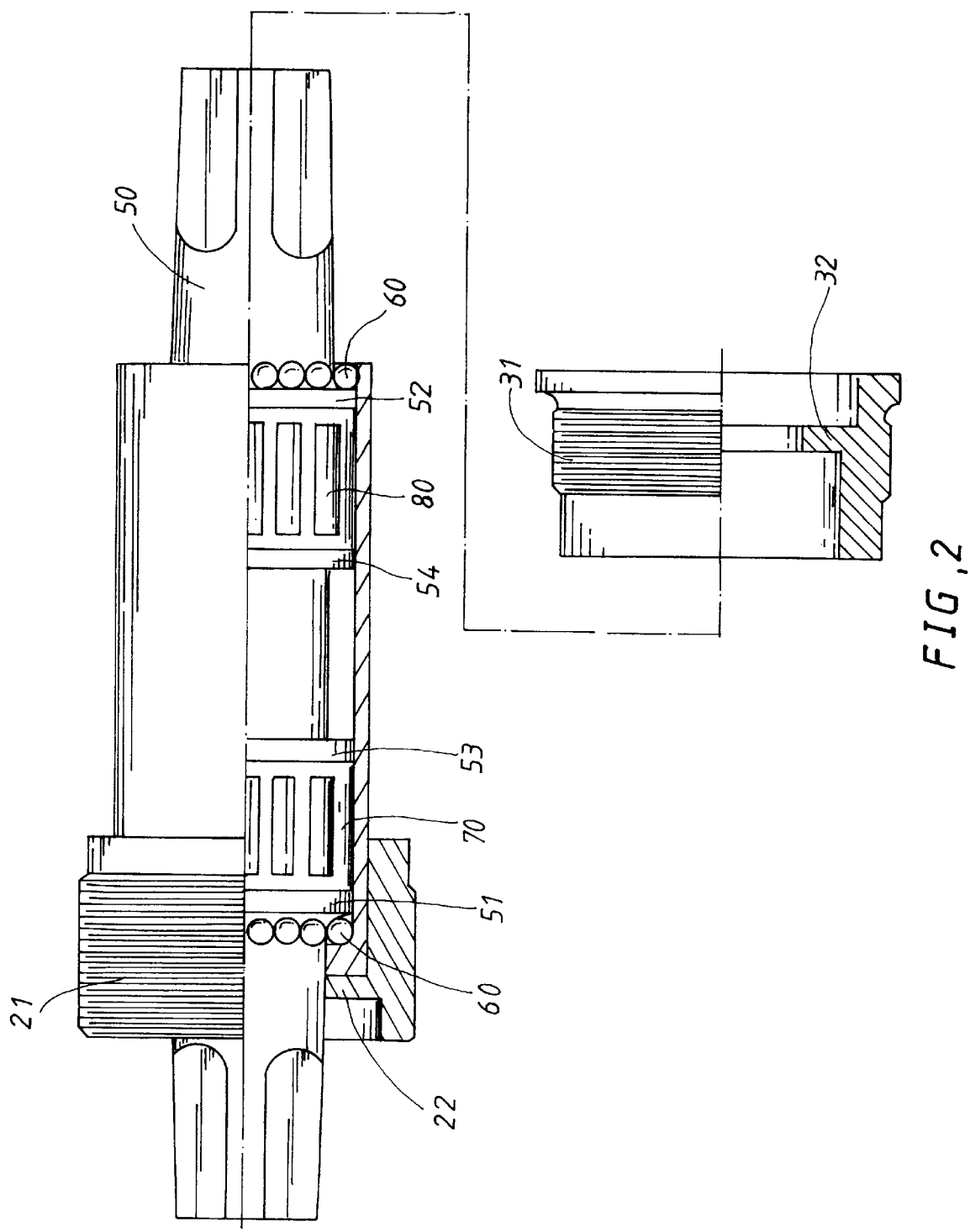
FIG. 2 is an exploded view, partly in section, of an axle, a first dust cap, two sets of bearings and a sleeve all of which are engaged together and a second dust cap in accordance with the present invention.
Figure 3:
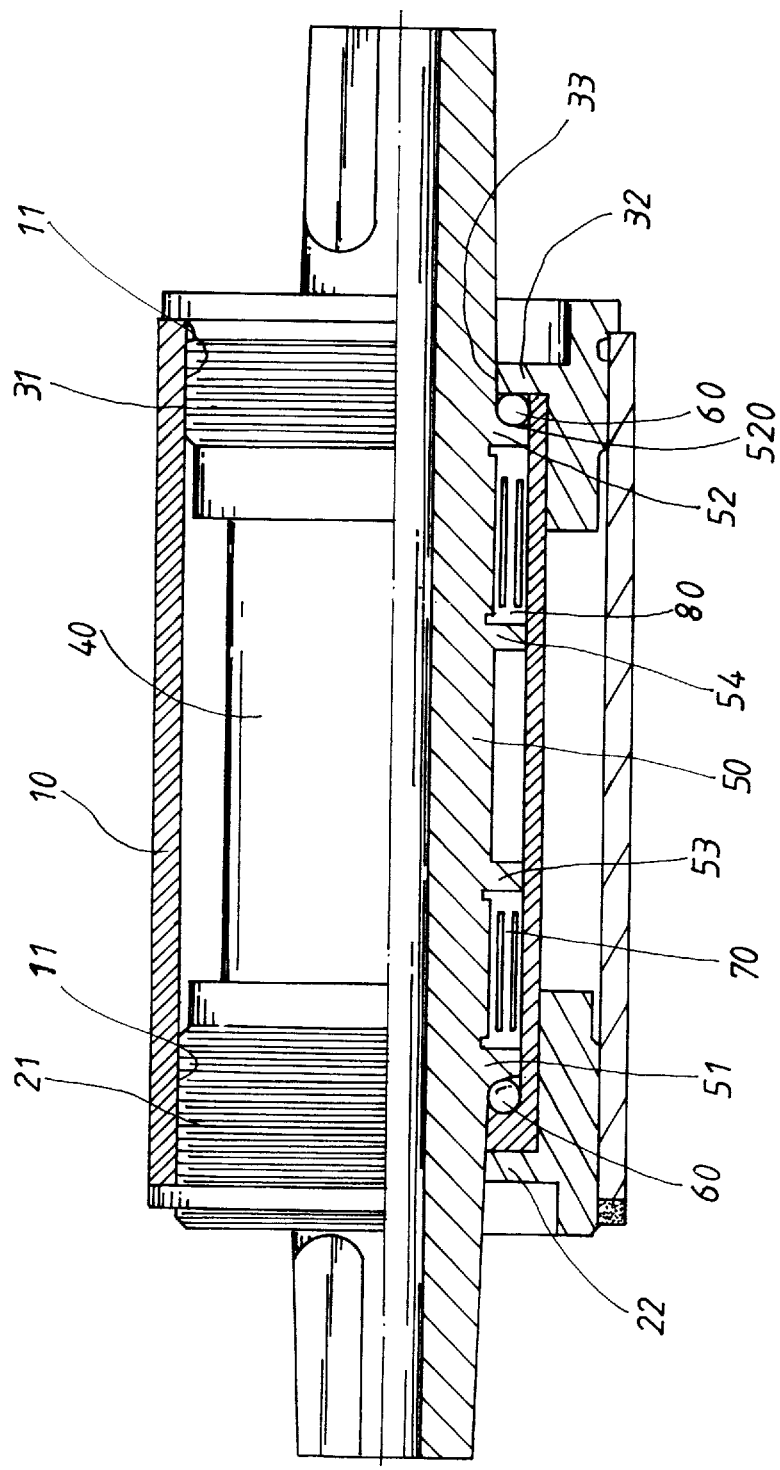
FIG. 3 is a side elevational view, partly in section, of the hub in accordance with the present invention.

Referring to FIGS. 1 through 3, a hub in accordance with the present invention generally includes a hub shell 10, the hub shell 10 having a first end and a second end, each of the first end and the second end having a threaded portion 11 defined in an inner periphery thereof.

A first dust cap 20 and a second dust cap 30, each of which having an outer threaded periphery 21, 31 defined in an outer periphery thereof for being threadedly engaged to the corresponding threaded portion 11 of the hub shell 10 respectively. Each of the first and the second dust caps 20, 30 has a loop-like flange 22, 32 extending inwardly and radially form an inner periphery thereof and each of the loop-like flanges 22, 32 defining a first hole 23, 33 enclosed by the loop-like flanges 22, 32 respectively.

A sleeve 40 has a first end and a second end, the first end thereof having a rim 41 extending inwardly and radially from an inner periphery thereof so as to define a second hole 42 enclosed by the rim 41, the second end of the sleeve 41 being an open end, the sleeve 40 disposed between the two loop-like flanges 22, 32 of the first and the second dust caps 20, 30.

An axle 50 has a first end and a second end, the axle 50 having a first flange 51 extending radially and outwardly therefrom near the first end, and having a second flange 52 extending radially and outwardly therefrom near the second end, the first flange having a first groove 510 defined in a side toward the first end of the axle 50 and the second flange 52 having a second groove 520 (FIG. 3) defined in a side toward the second end of the axle 50. The axle 50 is rotatably received in the sleeve 40 by disposing two bearings 60 therebetween, one of the two bearings 60 disposed between the first groove 510 and the first loop-like flange 22 and the other bearing 60 disposed between the second groove 520 and the second loop-like flange 32. A third flange 53 and a fourth flange 54 respectively extend outwardly and radially from the axle 50 and located between the first flange 51 and the second flange 52 and, a first bearing 70 is disposed to the axle 70 and located between the first flange 51 and the third flange 53, a second bearing 80 is disposed to the axle 50 and located between the second flange 62 and the fourth flange 54. The first and the second bearings 70, 80 each include a C-shaped retainer 71/81 and a plurality of rollers 72/82, the retainer 71/81 having a plurality of holes transversely defined therein each of which has one of the rollers 72/82 rotatably disposed therewith such that the retainer 71/81 can be securely mounted onto the axle 50 by being pulled wide from a gap 73/83 defined in the retainer 71/81 and then snapping the trainer 71/81 to the axle 50.

Accordingly, the axle 50 of the present invention has four bearings 60, 70 and 80 disposed thereto and this means the hub of the present invention may bear a larger load in comparison with the conventional hub which has only two bearings disposed thereto such that the requirements of a rider can be satisfied.

Although the invention has been explained in relation to its preferred embodiment, it is to be understood that many other possible modifications and variations can be made without departing from the spirit and scope of the invention as hereinafter claimed.

I claim:

1. A hub of a bicycle comprising:

a hub shell, said hub shell having a first end and a second end, each of said first end and said second end having a threaded portion defined in an inner periphery thereof;

a first dust cap and a second dust cap, each of which having an outer threaded periphery defined in an outer periphery thereof for being threadedly engaged to said corresponding threaded portion of said hub shell respectively, each of said first and said second dust caps having a loop-like flange extending inwardly and radially from an inner periphery thereof and each of said loop-like flanges defining a first hole enclosed by said loop-like flanges respectively;

a sleeve having a first end and a second end, said first end thereof having a rim extending inwardly and radially from an inner periphery thereof so as to define a second hole enclosed by said rim, said second end of said sleeve being an open end, said sleeve disposed between said two loop-like flanges of said first and said second dust caps;

an axle having a first end and a second end, said axle having a first flange extending radially and outwardly therefrom near said first end, and having a second flange extending radially and outwardly therefrom near said second end, said first flange having a first groove defined in a side toward said first end of said axle and said second flange having a second groove defined in a side toward said second end of said axle, said axle received in said sleeve and having two bearings disposed between said axle and said sleeve, wherein one of said two bearings disposed between said first groove and said first loop-like flange and the other bearing disposed between said second groove and said second loop-like flange, at least a third flange and a fourth flange extending outwardly and radially from said axle and located between said first flange and said second flange, and a first bearing disposed to said axle and located between said first flange and said third flange, a second bearing disposed to said axle and located between said second flange and said fourth flange.

2. The hub as claimed in claim 1 wherein said first and said second bearings each include a C-shaped retainer and a plurality of rollers, said retainer having a plurality of holes defined therein each of which has one of said rollers rotatably disposed therewith.

* * * * *